United States Patent

Hatta

[11] Patent Number: 5,020,762
[45] Date of Patent: Jun. 4, 1991

[54] POWER SEAT FOR AUTOMOBILE
[75] Inventor: Susumu Hatta, Akishima, Japan
[73] Assignee: Tachi-S Co., Ltd., Tokyo, Japan
[21] Appl. No.: 379,293
[22] Filed: Jul. 13, 1989
[51] Int. Cl.⁵ .................................... A45D 19/04
[52] U.S. Cl. ......................... 248/394; 74/89.18; 248/420; 248/421; 248/422; 248/429
[58] Field of Search ............. 248/394, 396, 397, 161, 248/404, 419, 420, 421, 422, 429, 157; 296/65.1; 297/330; 74/89.18

[56] References Cited
U.S. PATENT DOCUMENTS

| | | | |
|---|---|---|---|
| 4,364,536 | 12/1982 | Klüting | 248/420 X |
| 4,648,575 | 3/1987 | Kawade | 248/442 X |
| 4,720,070 | 1/1988 | Nishino | 248/422 X |
| 4,765,582 | 8/1988 | Babbs | 248/429 X |
| 4,767,156 | 8/1988 | Yamada et al. | 248/394 X |
| 4,775,126 | 10/1988 | Yokoyama | 296/65.1 X |
| 4,775,186 | 10/1988 | Nishino | 248/429 X |
| 4,834,333 | 5/1989 | Saito et al. | 248/422 X |

FOREIGN PATENT DOCUMENTS

| | | | |
|---|---|---|---|
| 2501958 | 8/1979 | Fed. Rep. of Germany | 248/397 |
| 63-11462 | 1/1988 | Japan . | |
| 63-17135 | 1/1988 | Japan . | |

Primary Examiner—Ramon O. Ramirez
Attorney, Agent, or Firm—Browdy and Neimark

[57] ABSTRACT

A power seat for an automobile wherein the seat cushion is adjustable in height or in a fore-and-aft direction by means of an electric motor. In such power seat, an upstanding bracket is provided on a slide rail adapted to permit fore-and-aft sliding movement of the seat cushion, and the electric motor is disposed at the lateral surface of the bracket. Hence, there is no need to dispose the motor beneath the seat cushion, and the seating point is lowered more, giving a wide space in the cabin of the automobile.

3 Claims, 2 Drawing Sheets

POWER SEAT FOR AUTOMOBILE

BACKGROUND OF THE INVENTION

1. Field of the Invention

The present invention relates to a power seat for an automobile, and particularly to an improvement of the power seat in which a seat cushion is adjustably moved in a vertical or fore-and-aft direction by means of driving force of an electric motor.

2. Description of Prior Art

In a power seat, a seat cushion is to be adjusted in its vertical position or forward/backward position by use of electric motors. Conventionally, the electric motors are arranged in such a manner as shown in FIG. 1 of the accompanying drawings. This is also suggested from the Japanese Laid-Open Patent Publication No. 63-11462, for instance.

In the FIG. 1, the electric motors used are the one designated at (109) for causing vertical movement of the forward portion of a seat cushion (not shown) and the other one at (102) for causing vertical movement of the rearward portion of the seat cushion In operation, the driving force of the first motor (109) is transmitted through a reduction gear (101') and transmission shaft (104') to a torque shaft (103) which is then rotated, causing two links (107)(107) to move vertically, so that the seat cushion fixed to the links (107)(107) is moved vertically. Thus, the forward portion of the seat cushion is adjusted its height. Likewise, from the second motor (102), its driving force is transmitted through a reduction gear (102') and transmission shaft (105) to a torque shaft (103), then, with the rotation of the torque shaft (103), two rearward links (108)(108) are moved vertically, so that the rearward portion of the seat cushion is adjusted its height. The two torque shafts (103)(104) are at their both ends supported by a pair of brackets (202)(202') in a rotatable manner. Designations (101)(101) denote a pair of slide rails each being composed of an upper rail (101a) and a lower (101b), the upper rail (101a) being slidably fitted in the lower rail (101b). The brackets (202)(202') are fixed on the upper rails (101a), respectively.

The above-constructed power seat, however, has been with such problem that the motors (101)(102) are disposed right beneath the seat cushion, creating an increase of the height of the seat cushion by the size of the motors (101)(102), as a result of which, the head level of an occupant on the seat cushion is higher and closer to the ceiling of the automobile, and the occupant feels depressed with such narrow cabin space.

In view of such drawback, the Japanese Laid-Open Patent Publication No. 63-17135 proposes disposing the motors on the floor of automobile, laterally of the seat cushion.

But, such motor arrangement is only suited at a rear seat side, not suited at a front seat side, in the automobile. The reason is that the motors at the lateral side of the seat cushion are exposed externally with the possibility of being damaged by the foot of an occupant, especially in the case of the door side. Further, even in case of the rear seat side, the motors require a greater number of fittings and special designs in order to be installed on the floor at that rear seat, thus still posing drawbacks technically and economically.

SUMMARY OF THE INVENTION

With the foregoing drawbacks in view, it is thus a purpose of the present invention to provide an improved power seat for an automobile which does not require any particular space for installation of an electric motor and gives a wide space in the cabin of the automobile.

In achievement of the purpose, the present invention comprises a slide rail adapted to permit a seat cushion to be adjustably moved in a fore-and-aft direction, a bracket which is fixed upon the slide rail, erecting therefrom, and an electric motor which causes the fore-and-aft movement of the seat back, wherein the electric motor is disposed at the lateral surface of the bracket.

Preferably, the bracket is formed at its upper end with an outwardly extending flange in such a manner as to extend beyond the projection of the motor and its associated elements, to thus protect them against external exposure or contact.

Accordingly, the location of the motor at the lateral surface of the bracket eliminates the need to arrange the motor beneath the seat back as found in the prior art, so that the seating point is lowered more, giving a wider space in the cabin of the automobile.

DETAILED DESCRIPTION OF PREFERRED EMBODIMENT OF THE INVENTION

Figure 2:
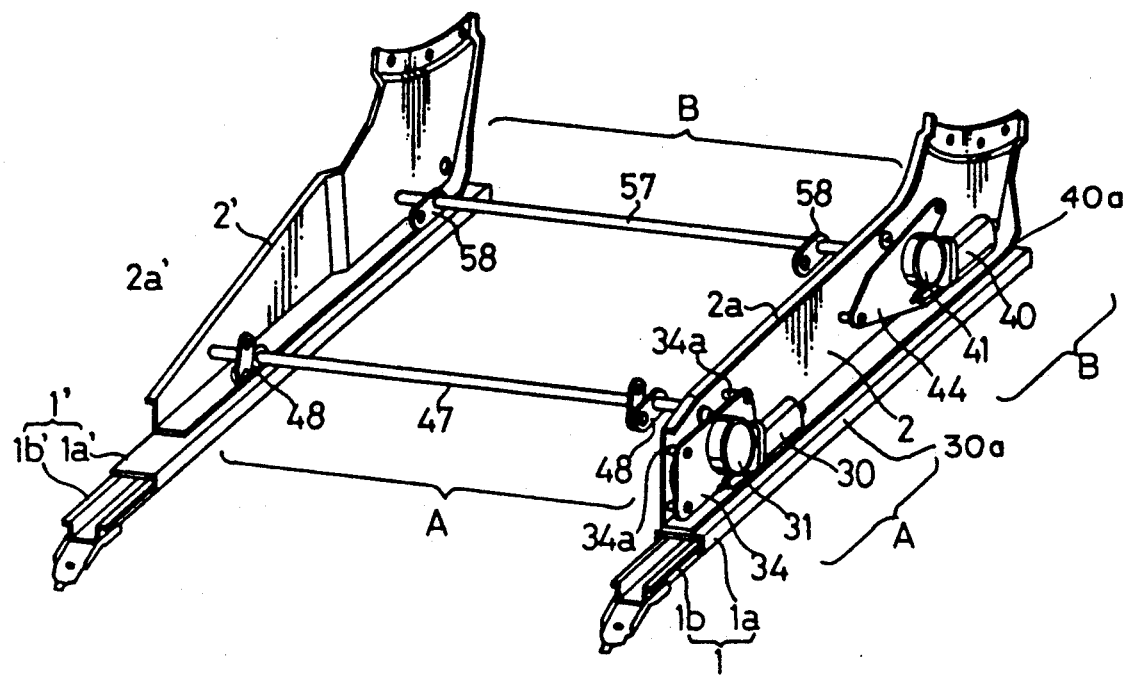
FIG. 2 is a perspective view of a framework of power seat in accordance with the present invention, in which a seat cushion frame is deleted.
Figure 3:
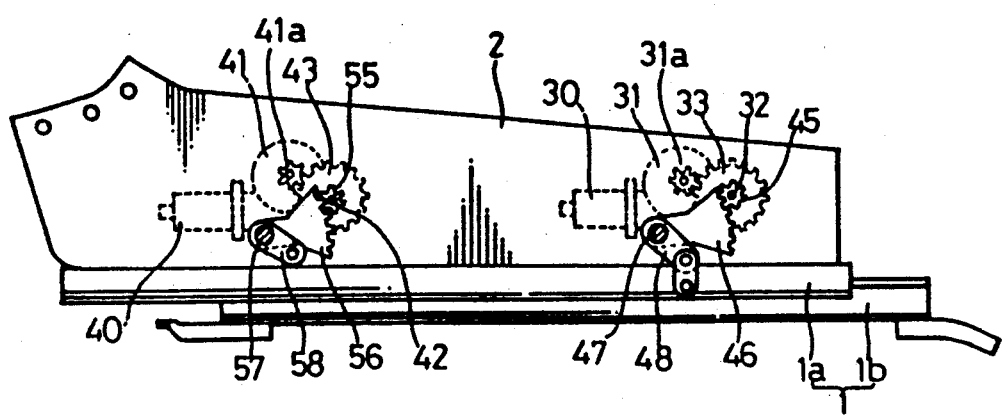
FIG. 3 is a side view of the same framework as in the FIG. 2.

With reference to FIGS. 2 through 3, is illustrative of an embodiment in accordance with the present invention.

FIG. 2 shows the lower seat adjusting devices comprising a pair of spaced-apart slide rails (1')(1) adapted to effect fore-and-aft adjustment of an seat cushion (not shown), a forward height adjusting mechanism (A) adapted to adjust the height of the forward part of seat cushion frame (6) (see FIG. 4), and a rearward height adjusting mechanism mechanism (B) adapted to adjust the helght of the rearward part of the seat cushion frame (6).

The slide rails (1)(1') are respectively comprised of lower rails (1b)(1b') and upper rails (1a)(1a') such that the upper rails (1a)(1a') are slidingly fitted in the lower rails (1b)(1b'), respectively.

Upon the respective upper rails (1a)(1a'), there erect upright brackets (2)(2') fixedly, each of them has an outwardly bent flange (2a)(2a') extending horizontally from the respective upper ends of the brackets (2)(2'). Preferably, in particular, the right-side flange (2a), as viewed from FIG. 2, extends above and beyond the projection of motors and associated elements, which will be set forth later, thereby protecting them against their sole exposure and contact with the external things.

As shown, at the upright brackets (2)(2'), are mounted the foregoing forward and rearward height adjusting mechanisms (A) and (B). Hereinafter, a specific statement will be made of those two height adjusting mechanisms (A)(B) which form a principal part of the present invention.

In both forward and rearward height adjusting mechanisms (A)(B), electric motors at designations (30)(40) are provided as a driving source, respectively. Those two motors (30)(40) are disposed at the outer lateral surface of the bracket (2) and fixed thereto by a first mounting plate (34) and second mounting plate (44) respectively. The motor driveshafts 30a and 40a extend parallel to the plane of said lateral surface. As illustrated, the mounting plate (34) extends above and along the outer lateral surface of the bracket (2) with a small space being provided therebeween via four support pins (34a) projected on that outer lateral surface of the bracket (2). Such small space is so enough to accommodate a reduction gear (33) and an output gear (31a) therein, as will be apparent below. Hence, the motor (30) lies horizontally upon the mounting plate (2). The same goes for the relevant portions of the rearward height adjusting mechanism (A). This is preferable in terms of reducing a projection of the mechanical parts from the lateral side of seat.

Figure 4:
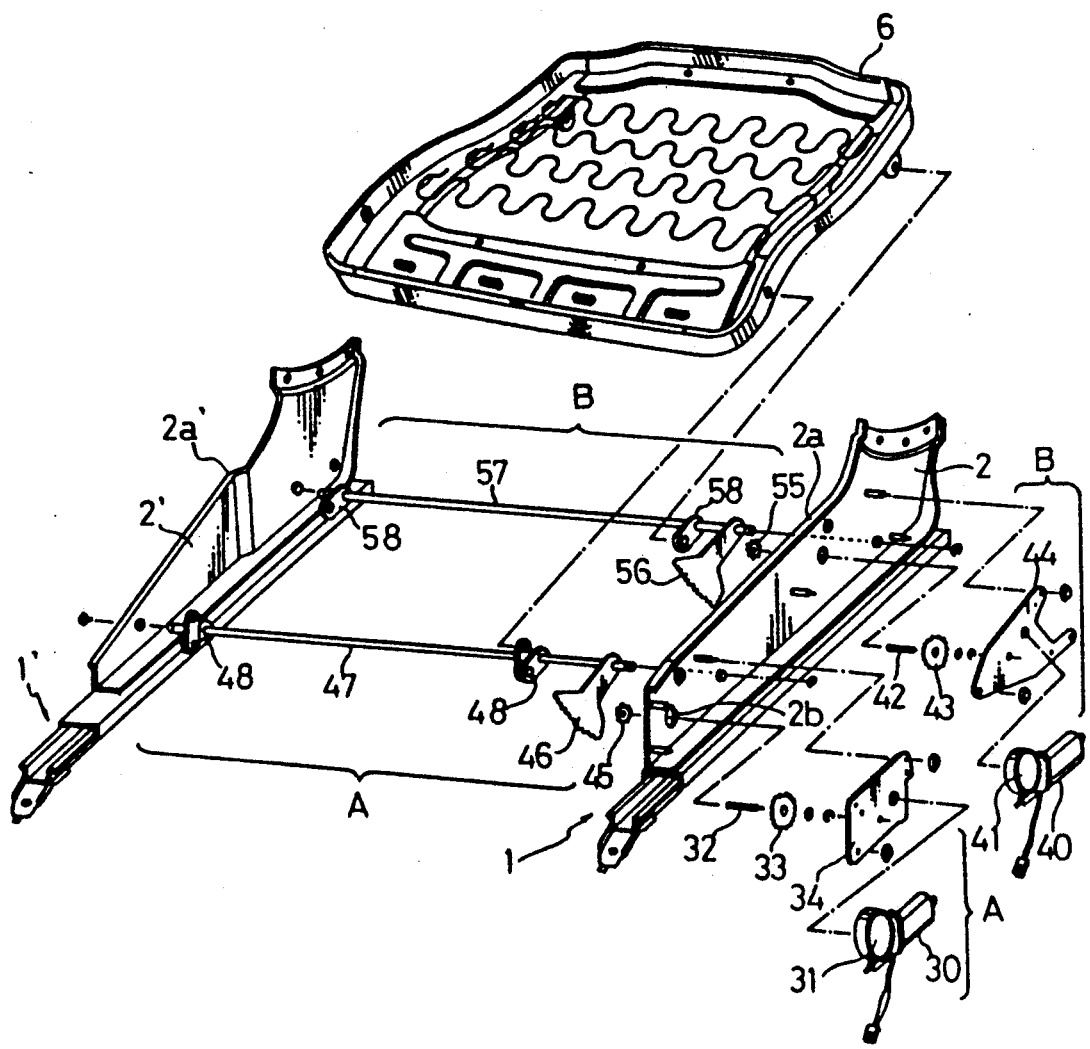
FIG. 4 is an exploded perspective view of the framework with a seat cushion frame in accordance with the present invention.

Specifically, the forward height adjusting mechanism (A) includes, let along the motor (30) and mounting plate (34), a gear box (31) which is provided adjacent to the motor (30) and has an output gear (31a) projecting from the inner side thereof, a reduction gear (33) interposed between the mounting plate (34) and outer lateral surface of the bracket (2), the reduction gear (33) being fixed on a pin (32) whose one end is rotatably secured to the mounting plate (34) and whose other end passes through the hole (2b) of the bracket (2), with a pinion gear (45) fixed to the extremity of that other end of the pin (32), wherein it is so arranged that the reduction gear (33) is meshed with the output gear (31a) whereas the pinion gear (45) is meshed with the sector gear (46), and a connecting shaft (47), to one end of which is fixed the sector gear (46) as shown. To the connecting rod (47), are fixed a pair of link members (48)(48) which are further connected with the seat cushion frame (6) as seen in FIG. 4.

The rearward height adjusting mechanism (B) is constructed in the same manner as above, and, in brief, in addition to the motor (40) and mounting plate (44), it includes a gear box (41), an output gear (41a), a reduction gear (43), a pin (42), a pinion gear (55), a sector gear (56), a connecting rod (57), and a pair of link members (58)(58).

In the illustrated embodiment, those elements of both height adjusting mechanism (A)(B) are almost identical to each other, but are not always arranged as such and various arrangements may be made depending on the designs or tastes, insofar as the driving elements, namely, the motors (30)(40), mounting plates (34)(44), etc., are disposed at one side of the brackets (2)(2').

In operation, let us now explain the forward adjusting mechanism (A) only, for the sake of simplicity in description. When firstly the motor (30) is driven, the output gear (31a) is rotated, causing the reduction gear (33) and thus the pin (32) to rotate simultaneously, and the pinion gear (45) is then caused to rotate to effect vertical rotation of the sector gear (46), which in turn transmits the rotation force via a connecting rod (47) to the two link members (48)(48). Consequently, the vertical movement of the link members (48)(48) is produced, and in response to such up-and-down movement, the seat cushion frame (6) is raised or lowered at its forward part. In that manner, an occupant on the seat cushion can adjust the seating height a the forward seat point.

Because of its structural identity to such forward height adjusting mechanism (A), the same mechanical motions are effected in the rearward height adjusting mechanism (B), and thus, a description thereon is omitted.

Accordingly, with the cooperative motions of the two height adjusting mechanisms (A)(B), the seating height as well as the fore-and-aft seating position may be adjusted at a preferred point by switching operations for the motors (30)(40).

While the above descriptions are made for the illustrated embodiment, yet the present invention is not limited thereto, and any other modifications, replacements and additions may structurally be possible without departing from the spirit and scope of the appended claims. For example, the motors (30)(40), gear boxes (31)(41), mounting plates (34) and reduction gears (33)(43) may be disposed at the inner lateral surface of the bracket (2). Further, a fore-and-aft adjusting mechanism for adjusting the slide rails (1)(1') in the fore-and-aft directions may be provided in the above-described structure such that an associated motor is disposed at the outer or inner lateral surface of one of the brackets (2)(2') like the embodiment shown.

Figure 1:
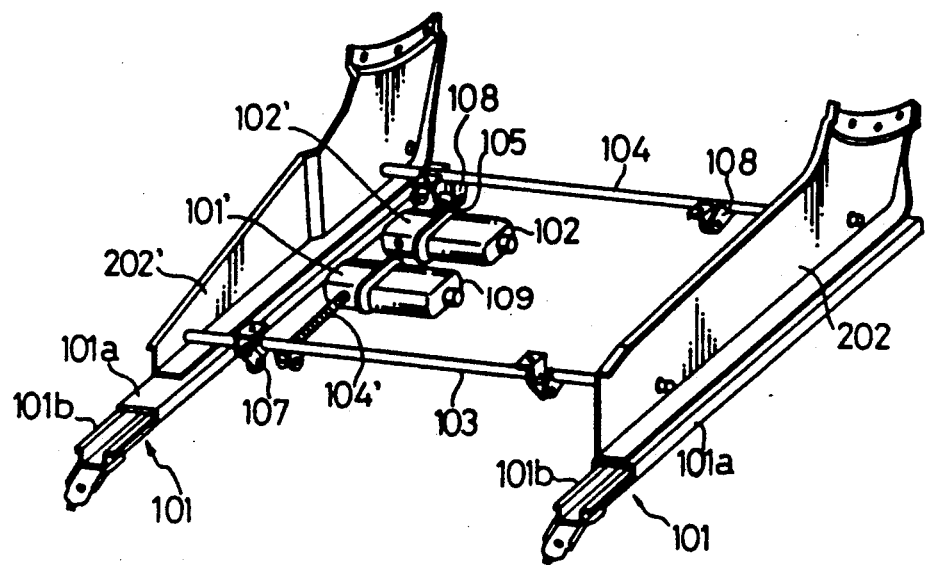
FIG. 1 is a perspective view of a conventional power seat for an automobile.

Therefore, according to the present invention, it is to be appreciated that the location of the motors (30)(40) at the lateral surface of the bracket (2) eliminates the need to install the motors on the floor or part of the automobile, thus reducing a cost for the motor installation, and further permits the adjusting mechanisms (A)(B) to be applied to a front seat without any problem. Particularly, there is no space created beneath the seat cushion as in the prior art in FIG. 1, and the seating height point is lowered, whereby an occupant on the seat is not subjected to a cramped or depressed feeling within the cabin of the automobile, and the present invention is indeed sufficiently usable in a small automobile.

What is claimed is:

1. A power seat for an automobile, in which a seat cushion is moved in a vertical direction or in a fore-and-aft direction by means of a driving force of an electric motor, and power seat comprising:

a slide rail provided under said seat cushion, said slide rail being adapted to allow said seat cushion to be adjustably moved forwardly and backwardly, and including an upper rail and a lower rail, said upper rail being slidably fitted in said lower rail; and a bracket fixed on said upper rail of said slide rail in a manner erecting thereupon, wherein said electric motor is disposed at a lateral surface of said bracket and extends in parallel to said surface and has its drive shaft parallel to said surface wherein said power seat further comprises a forward height adjusting mechanism adapted to adjust a height of a forward part of said seat cushion and a rearward height adjusting mechanism adapted to adjust a height of a rearward part of said seat cushion, and wherein said electric motor is provided two in number, one of them being arranged to actuate said forward height adjusting mechanism and the other of them being arranged to actuate said rearward height adjusting mechanism.

2. The power seat according to claim 1, wherein said slide rail comprises a pair of spaced-apart slide rails and said bracket is fixed on each of said two slide rails, thus comprising a pair of spaced-apart brackets, wherein said electric motor is disposed at a lateral surface of one of said two brackets and wherein there is extended a torque shaft rotatably between said pair of brackets, said torque shaft being connected operatively with said electric motor, wherein upon said torque shaft, is fixed a link member which is connected to said seat cushion, and wherein, when said electric motor is energized, said torque shaft is rotated by a driving force of said motor, which in turn causes simultaneous rotation of said link member, to thereby effect vertical movement of said cushion seat.

3. The power seat according to claim 1, wherein said electric motor is located at an outer lateral surface of said bracket, and wherein said bracket is formed at its upper end with a outwardly bent flange.

* * * * *